United States Patent [19]

Pomernacki

[11] 3,872,561

[45] Mar. 25, 1975

[54] METAL CUTTING AND FINISHING TOOL
[75] Inventor: Henry Pomernacki, Northbrook, Ill.
[73] Assignee: Illinois Tool Works Inc., Chicago, Ill.
[22] Filed: Feb. 7, 1974
[21] Appl. No.: 440,429

[63] Continuation-in-part of Ser. No. 297,514, Oct. 13, 1972, Pat. No. 3,792,524.

[52] U.S. Cl................. 29/95.1, 29/567, 29/95 C
[51] Int. Cl............................ B26d 1/04, B26d 1/00
[58] Field of Search............ 29/95, 95 C, 95.1, 567; 83/837, 850, 854; 408/54

[56] References Cited
UNITED STATES PATENTS

| 543,608 | 7/1895 | Beale | 29/95 C |
|---|---|---|---|
| 1,676,071 | 7/1928 | Bolinder | 83/854 |
| 2,657,720 | 11/1953 | Wolfe | 83/354 |
| 2,720,229 | 10/1955 | Drake | 29/95 C |
| 3,537,491 | 11/1970 | Kolesh | 83/837 |
| 3,641,642 | 2/1972 | Schmidt | 29/95.1 |
| 3,792,524 | 2/1974 | Pomernacki | 29/567 |

Primary Examiner—Harrison L. Hinson
Attorney, Agent, or Firm—Robert W. Beart; Thomas W. Buckman

[57] ABSTRACT

A cutting tool, such as a blade-type saw for cutting arcuate slots, which includes a plurality of alternately arranged roughing and finishing teeth, and which is provided with relatively narrow land portions associated with each tooth and interconnected by thin web portions.

6 Claims, 11 Drawing Figures

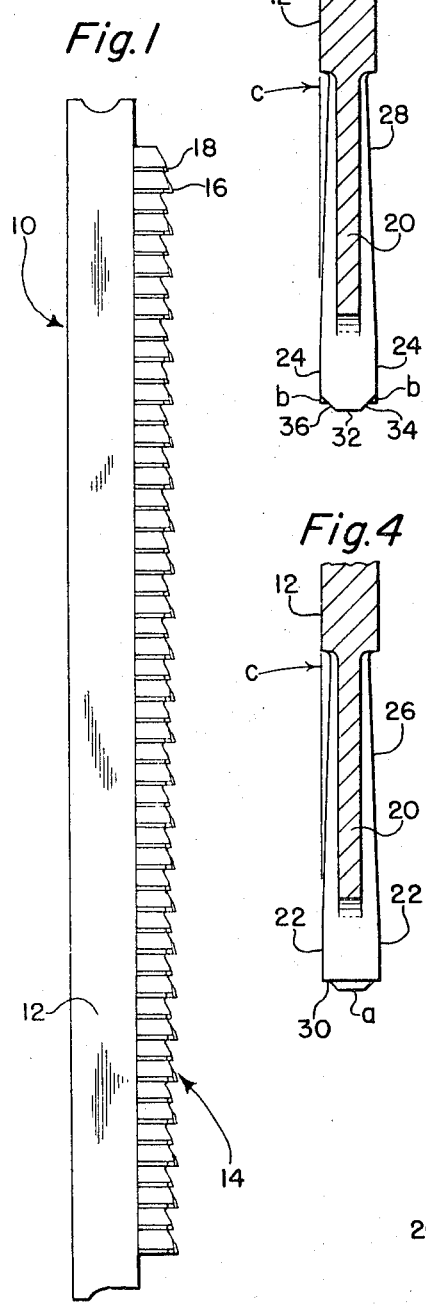
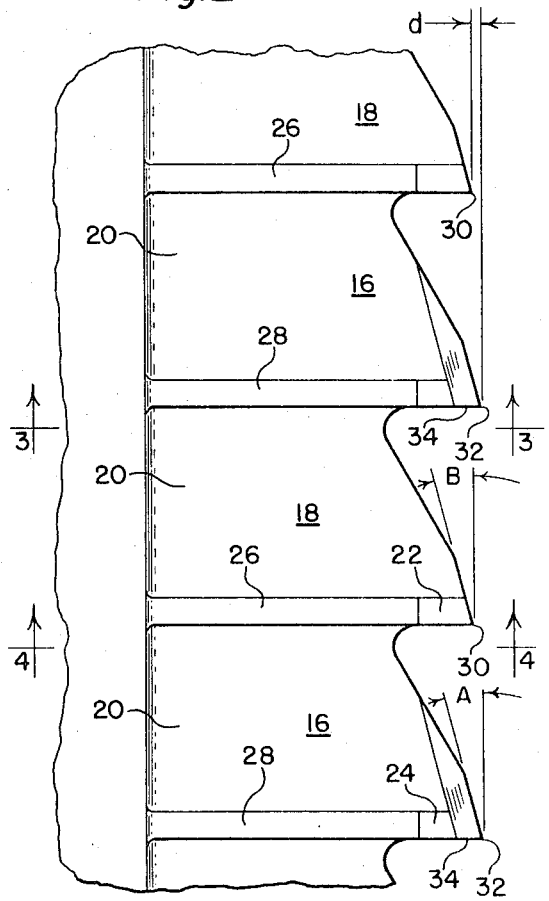
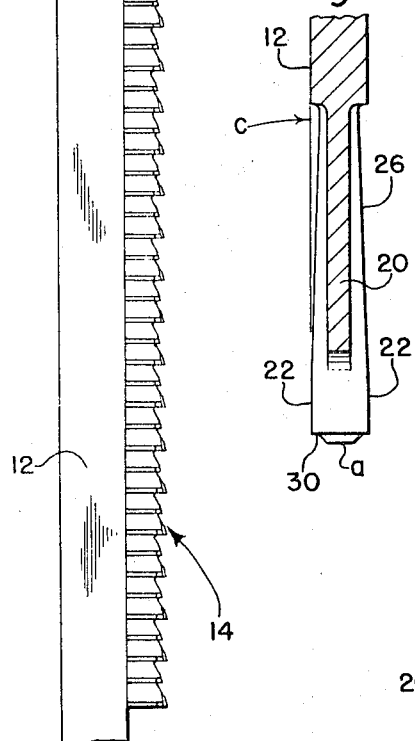
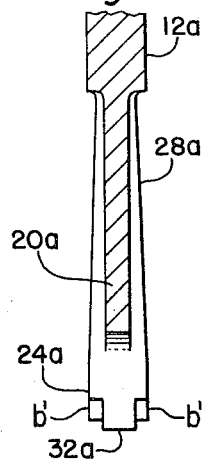
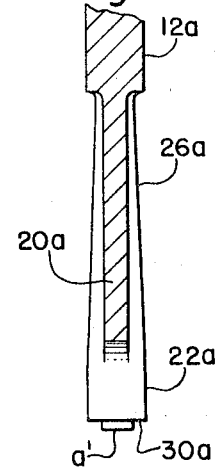

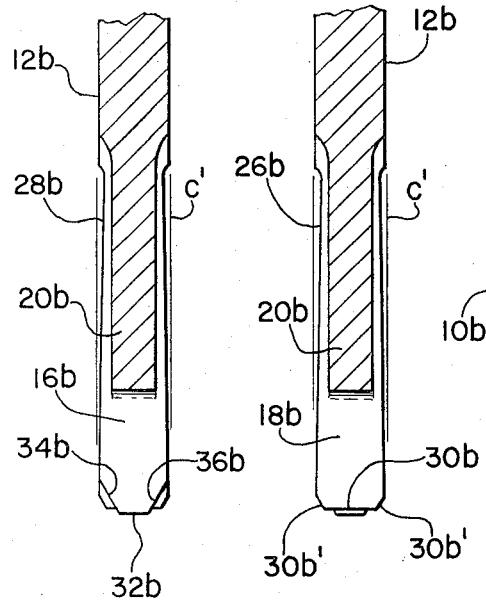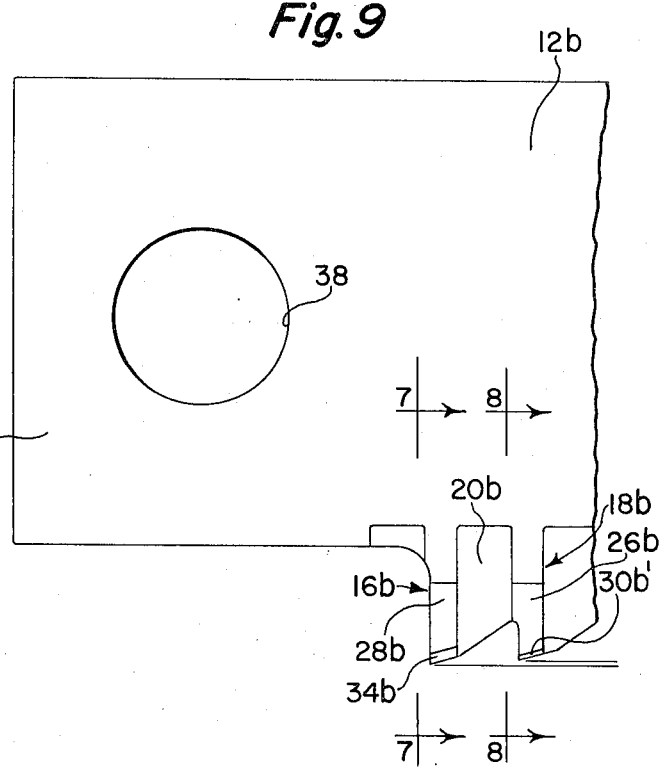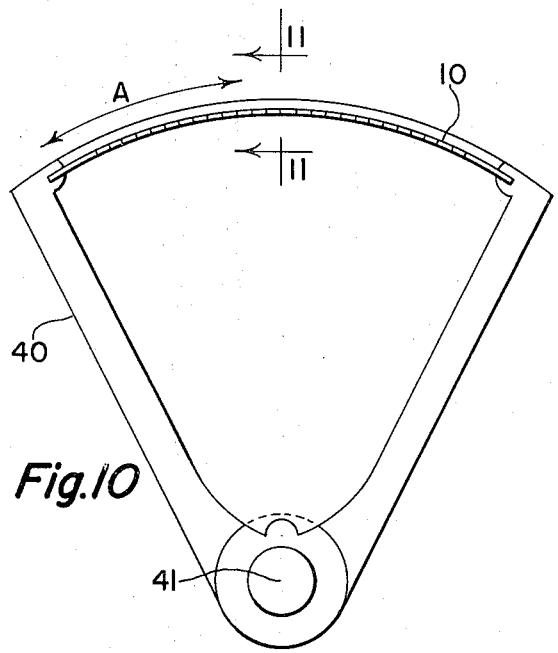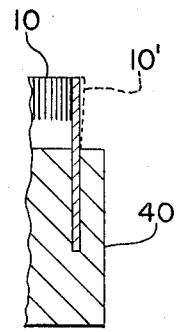

METAL CUTTING AND FINISHING TOOL

CROSS REFERENCE TO RELATED APPLICATION

This application is a Continuation-In-Part of Ser. No. 297,514, filed Oct. 13, 1972.

BACKGROUND OF THE INVENTION

This invention relates to a saw-type cutting tool and more particularly to a cutting tool which is capable of accurately forming an arcuate slot in a workpiece, such as metal, in such a manner as to provide a precision finish on the side surfaces of such a slot.

One problem of particular concern in certain metal cutting operations is the ability of the tool to provide a smooth precision finish on the surfaces of the workpiece which have been subjected to the cutting or metal removing action of the tool. One example of such an operation requiring attention to precision in these surfaces is the formation of seal accommodating slots in a rotary combustion engine rotor. Various machines and tools have been devised to rapidly form such slots. An example of a method and apparatus for forming slots in such a workpiece is shown and described in the co-pending commonly assigned application, Ser. No. 244,030, entitled "Method and Tooling for Cutting Side Seal Grooves," now U.S. Pat. No. 3,786,702.

The novel tool described herein will provide highly accurate arcuate slots when used in conjunction with the machine described in the above co-pending application, but is not limited to such a use and environment.

A further problem encountered in using prior art saw-type tools in operations requiring a precision finish is that the pressure exerted by the chip itself in the kerf being cut will mar or score the side surface of the slot.

The foregoing problems are essentially alleviated by the special tooth and side surface configurations provided by this invention. Roughing and finishing teeth are alternately arranged along the cutting edge of a blade-type tool. The roughing tooth is longer than the finishing tooth but has a terminal cutting edge which is narrower than the finishing tooth. In addition, substantially flat narrow lands are located adjacent the terminal cutting edge of the teeth and extend generally perpendicular to the longitudinal axis of the blade. These lands are interconnected by thin web portions and may be particularly designed to rub and polish the sides of the slot or kerf being cut.

The foregoing and other objects, features and advantages will be apparent from the following more particular description of the various embodiments thereof as illustrated in the accompanying drawings.

BRIEF DESCRIPTION OF THE DRAWINGS

FIG. 1 is a side view of a tool including teeth designed in accordance with the present invention.

FIG. 2 is an enlarged fragmentary side view of the tool particularly showing the tooth construction and design of the invention.

FIG. 3 is a partial vertical cross section taken along line 3—3 in FIG. 2.

FIG. 4 is a partial vertical cross section taken along line 4—4 in FIG. 2.

FIG. 5 is a partial vertical cross section, similar to that of FIG. 3, but of an alternate embodiment of the invention.

FIG. 6 is a partial vertical cross section, similar to FIG. 4, of the alternate embodiment shown in FIG. 5.

FIG. 7 is a partial vertical cross section taken along lines 7—7 of FIG. 9 showing another embodiment of the invention.

FIG. 8 is a partial vertical cross section taken along lines 8—8 of FIG. 9 showing another embodiment of the invention.

FIG. 9 is an enlarged fragmentary side view of another embodiment of the tool.

FIG. 10 is a plan view of a tool holding fixture showing the cutting edge of the tool of the present invention retained therein.

FIG. 11 is a partial cross-sectional view of the tool clamped taken along lines 11—11 of FIG. 10.

DESCRIPTION OF THE PREFERRED EMBODIMENTS

Referring now specifically to the drawings, the cutting tool of the present invention is designated generally by reference numeral 10. FIG. 1 shows one embodiment of the tool 10 as including an upper body portion 12 with appropriate blade holding means located at either end and a series of cutting teeth 14 along one longitudinal edge of the body. As is shown most clearly in FIG. 2, the cutting edge of the tool includes relatively long teeth 16 and shorter teeth 18 disposed alternately along the length thereof. The difference in the length of these two teeth is shown as distance $d$.

Flat, parallel surfaces 22 and 24 are provided on finishing teeth 18 and roughing teeth 16, respectively. These surfaces serve as burnishing lands and extend upwardly a short distance from the terminal edges of the teeth and will be described in detail in the description to follow.

The roughing teeth 16 shown in the preferred embodiment of FIGS. 2-4 include a terminal cutting edge 32 and a pair of diverging cutting edges 34 and 36. Thus, the cross section of the chip made or removed by this roughing tooth 16 will resemble the portion $a$ in FIG. 4. The use of a roughing tooth with a terminal cutting edge, such as 32, which is of less width than the desired width of the kerf prevents the chip from exerting side pressures against the finished surface of a slot and marring the finish thereon.

It will be apparent from FIG. 3 that the cross section of the chip removed by the terminal cutting edge 30 on finishing teeth 18 will resemble the areas $b$. Thus, the finishing tooth completes the removal of the material in the kerf to size the slot to the precise width desired. The removal of the two side corners of the chip by the finishing teeth 18 allows room for the chip material to flow inwardly and thus again prevents marriage of the side surface finish.

The combination of a longer roughing tooth 16 with a shorter finishing tooth 18, alternately disposed along the cutting edge of the tool will thus allow material to be removed in a rapid and efficient manner while eliminating stress or pressure which tends to be exerted on the side surfaces of a kerf by the chip itself. In actual practice it has been found that the distance $d$ which the longer tooth 16 extends below the shorter tooth 18, is most efficiently designed to be approximately 0.005 inches for use in environments described in the above mentioned co-pending application, Ser. No. 244,030. It should be understood, however, that for other applications or environments the distance $d$ will vary in accordance with the specific conditions required for the particular workpiece and/or environment.

Relief or clearance angles A and B are provided in a somewhat conventional manner behind the terminal cutting edges of the roughing teeth 16 and finishing teeth 18. The teeth may be interconnected or joined by a web-like portion 20 of a thickness less than the desired thickness of the kerf.

Each tooth is shown to include a pair of parallel side flat surfaces, such as 22 and 24. These surfaces extend a short distance behind the plane of the cutting edges 32, 34, 36 and 30 in each of the roughing teeth 16 and 18, respectively. It should be noted that these surfaces lie in planes which are generally perpendicular to the plane which includes the terminal cutting edges. That is, they are not relieved either behind the cutting edge nor above the cutting edge. These areas, thus, provide a small surface which serves to burnish or polish the side walls of the slot being cut in the workpiece. Slight relief may be provided above these burnishing lands 22 and 24 by the provision of inwardly tapered land extensions 28 and 26 which join the parallel surfaces 24 and 22, respectively, to the body 12 of the tool and which are generally extensions of the side surfaces of the body.

The tool of the present invention is particularly adapted to accurately finish the surfaces of a slot by using rapidly reciprocating strokes, the total stroke distance being relatively short, say for example equal to one or two pitches of the teeth on the tool. An accurately controlled or cam operated tool acutating device which uses the tool of the present invention will quickly cut a kerf of the desired depth while burnishing lands 22 and 24, rub the side walls of the kerf many times during the cutting operations to impart a shiny, precision finish to them.

The embodiment shown in FIGS. 5 and 6 describes another configuration of a roughing tooth which will function in accordance with the teachings of this invention. The diverging terminal cutting edges are eliminated and terminal cutting edge 32a will function much in the same manner as terminal cutting edges 32, 34 and 36 in the preferred embodiment. However, the embodiment shown in FIGS. 5 and 6 provides only two cutting edges to be sharpened for each group of two teeth as opposed to the four cutting edges, namely 32, 34, 36 and 30, which must be sharpened in the preferred embodiment.

The embodiment shown in FIGS. 7-9 show another inventive feature of the cutting blade 10b wherein the finishing teeth 18b are provided with chamfer portions 30b' at the corners of the cutting edge 30b. The finish cut will thus be made by removing chip material at an obtuse angle to the side surfaces and thus such removal will be accomplished with a minimum of side pressure on the wall surfaces of the curves. The configuration also reduces the tendency of the chip separation forces to be localized which would produce a score line at each successive feeding level.

A stated above, the blade-type tool of the present invention is designed to accurately form an arcuate seal accommodating slot in a rotor for a rotary combustion engine. Accordingly, another feature of the above described tool may be shown with reference to FIGS. 1, 9, 10 and 11. In addition to the requirement that the seal accommodating slot have a precision finish on the walls thereof to prevent gas from leaking through the seals that are received therein, the efficiency of the sealsl depends on the accuracy of forming a slot which is perpendicular to the face of the rotor. A slot which leans or is angularly disposed to a plane vertical to the face of the rotor is undesirable. The novel land and web structure of blades 10 and 10b of the present invention insure that arcuate slots are formed perpendicularly to the face of the rotor.

FIGS. 10 and 11 show a blade of the present invention clamped with the aid of blade holding apertures 38 in an appropriate fixture 40. The fixture will then be oscillated about a pivot point 41 in the direction A to form arcuate slots in a rotor workpiece. The presence of the narrow lands 26, 28 and 26b, 28b interconnected by thin web sections 20 and 20b allows the cutting edges to assume the accurate arcuate configuration defined by the clamped base of the blade. Thus, in FIG. 11 the longitudinal edge, including the terminal cutting edges, will be perpendicular to the fixture and the workpiece when opeatively associated therewith. The dotted line position of blade 10' shown in FIG. 11 describes the condition that the prior art blades would assume and which condition is highly undesirable. Since the cutting edge of the blade is free while the body is clamped, the cutting edge is free to react to the stresses of compression and tension acting on opposing side surfaces when the blade is bent into an arcuate configuration. The dotted line position of FIG. 11 indicates that the cutting edge of a blade may be deformed into a larger radius curve than the body as a result of these uncontrolled bending forces on the free outer edge. The narrow lands 26 and 28 and 26b and 28b are interconnected by thin cross section web section 20 and 20b and which have a significantly greater width along the longitudinal direction of the blade than the land portion. The lands will extend perpendicular to the longitudinal edge and will not generally resist the bending dictated by the clamped base portion. The thin webbed portions flex relatively freely to assume the desired arcuate configuration.

The land portions 26, 26b and 28, 28b are all substantially unrelieved both above the cutting edge and from the front edge of the trailing edge of the land. The side surfaces of the teeth may, however, be finish ground resulting in a clearance angle c' or c which may be of the order of 0°–30'. However, the land portions may be considered as essentially extensions of the body portions in that area.

The narrow width of the land portions minimizes the surface contact in the slots between the blade and the curved wall while the portion formed by the webs provides an area into which chip material may flow without causing harm to the precision finish formed on the walls of the slot.

The embodiments described above are representative of a novel type tool which will rapidly remove material in the formation of a blind kerp or slot and is particularly advantageous in the formation of an arcuate seal accommodating slot. In addition to the rapid material removing capabilities of this tool, it is provided with novel narrow lands and thin web sections to enable a cutting edge portion of the blade to form an accurate arcuate slot which is perpendicular to the surface of the rotor face.

It is apparent that there has been provided, in accordance with the invention, a metal cutting and finishing tool that fully satisfies the objects, aims and advantages set forth above. While the invention has been described in conjunction with specific embodiments thereof, it is evident that many alternatives, modifications and variations will be apparent to those skilled in the art due to the foregoing description. Accordingly, it is intended to embrace all such alternatives, modifications and variations as fall within the spirit and broad scope of the appended claims.

I claim:

1. An elongate multitooth metal cutting and finishing blade adapted to accurately form arcuate blind slots, comprising a blade body, a plurality of cutting teeth along a longitudinal edge thereof, the cutting teeth including cutting edges lying in a plane generally perpendicular to the plane of the blade body, the side surfaces of the teeth including narrow land portions of predetermined length and width which are substantially extensions of side surface areas of the body and the length dimension of each land portion extends substantially perpendicular to the plane including the cutting teeth, the land portions being interconnected by web portions of thinner cross section than the land portions, the width of the land portions being substantially less than the width of the web portions so that the blade may be bent into an arcuate configuration and the web and land portions permitting the cutting edge to accurately assume the predetermined arcuate path.

2. A metal cutting blade in accordance with claim 1 wherein the lands are substantially unrelieved across the width dimension from the front edges thereof to the back edges thereof.

3. The metal cutting blade in accordance with claim 1, wherein the webs and lands extend a distance toward the body of the blade greater than the depth of the gullets of the teeth.

4. A metal cutting blade in accordance with claim 1, wherein the plurality of cutting teeth include a series of identical groups each group including a long roughing tooth and a shorter finishing tooth, the finishing tooth including chamfered corner portions interconnecting the lands to the terminal cutting edge whereby deleterious side pressure exerted on the kerf by chips is greatly diminished allowing the teeth and lands to form a precision finish on the side walls of the kerf.

5. A metal cutting blade in accordance with claim 4, wherein the roughing tooth includes a terminal cutting edge of less width than the terminal cutting edge of the finishing tooth, chamfer portions interconnecting the roughing tooth terminal cutting edge to the respective land portions.

6. A blade-type metal cutting and finishing tool adapted to form an accurate arcuate blind slot having precision finish walls in the slot, comprising an elongate blade body with a plurality of cutting and finishing teeth formed along one longitudinal edge thereof, the plurality including identical long roughing teeth alternately positioned between identical shorter finishing teeth, relative narrow substantially unrelieved lands having a predetermined length and width dimension formed on both side surfaces of the teeth, the length dimension of the lands extending substantially perpendicular to said one longitudinal edge, the lands extending from the terminal edge of the teeth to the body a greater distance than the depth of the gullet between teeth, web portions interconnecting adjacent lands of less thickness than the thickness defined by opposing lands, the web portions being a substantially greater dimension longitudinally of the blade than the lands, the finishing teeth including chamfered corners forming a terminal cutting edge thereon that substantially minimizes harmful pressure on the side of the slot, the land and web portions allowing the blade to freely bend to form an arcuate slot essentially perpendicularly disposed to the surface of the workpiece in which it is formed.

* * * * *